Patented Nov. 10, 1925.

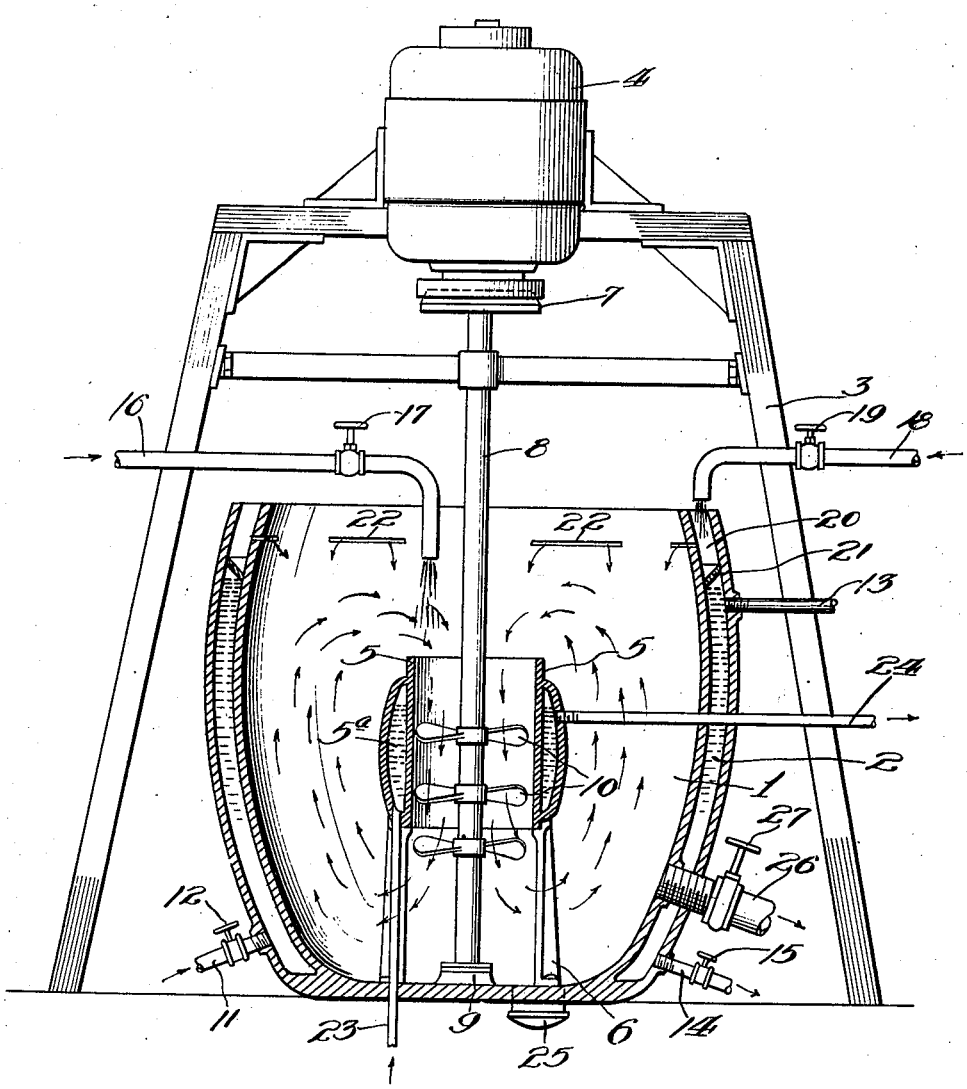

1,560,826

UNITED STATES PATENT OFFICE.

LESTER KIRSCHBRAUN, OF CHICAGO, ILLINOIS.

APPARATUS FOR MAKING BITUMINOUS EMULSION.

Application filed April 24, 1924. Serial No. 708,649.

*To all whom it may concern:*

Be it known that I, LESTER KIRSCHBRAUN, a citizen of the United States, residing in the city of Chicago, county of Cook, and State of Illinois, have invented certain new and useful Improvements in Apparatus for Making Bituminous Emulsion, of which the following is a specification.

This invention relates to improvements in apparatus for making bituminous emulsion, and refers more particularly to an apparatus for making aqueous bituminous emulsions in which the adhesive particles of bituminous or like substances are enveloped in a non-adhesive film or coating, rendering the emulsion non-adhesive.

Among its salient objects are to provide an apparatus for making emulsions continuously of bituminous or other adhesive substances by emulsifying the same with clay or like colloidal substances in an aqueous liquid with the addition of a third substance which has a characteristic of causing the non-adhesive coating surrounding each of the dispersed adhesive particles to more firmly envelop the adhesive bitumen or like adhesive substance dispersed through the emulsion so that the emulsion is very resistant to pressure, dilution or any other factor commonly tending to disintegrate the enveloping non-adhesive coatings; to provide an apparatus in which, by means of the addition of a third substance, the clusters of non-adhesive particles surrounding the adhesive material in the emulsion are caused to cling tenaciously to the adhesive substance, making the emulsion substantially more permanent in its character; to provide an apparatus holding a bulk supply of emulsion under circulation at predetermined temperature; and, in general, to provide an apparatus of the character referred to.

The single figure is a side view partly in section of the apparatus used for producing this emulsion.

Referring to the drawing, a jacketed container 1 surrounded by jacket 2 is held in position beneath frame members 3 upon which is mounted an overhead motor 4. Within the container is positioned a jacketed open ended cylinder 5 supported by suitable standards 6. Connected by means of a friction connection shown diagrammatically at 7 is a vertical shaft 8 which is set in a lower bearing 9 in the bottom of the container. On this shaft are propellers 10 having their blades pitched in a manner to cause a circulation of the emulsion during the mixing operation in a path shown by the arrows. The container is barrel shaped to present a smooth surface, and a shape which will offer the least frictional resistance to the substances circulated therein. Into the outer jacketed portion may be introduced steam or water through the inlet pipe 11 controlled by the valve 12 and after circulation about the jacketed portion 2, the circulating medium may be drawn off through the outlet pipe 13. In case steam is circulated, a condensation drawoff line 14 controlled by the valve 15 is tapped into the bottom of the jacket.

The purpose of circulating the heating or cooling medium about the condensate is to maintain the emulsion which is produced therein, at the desired temperature, as it is a well known fact that the temperature at which the substances are maintained during emulsification, is a vital factor in the production of a satisfactory combination for emulsification of the substance introduced thereto.

The bitumen, pitch or adhesive binder substance to be emulsified is introduced through the line 16 controlled by the valve 17 while the water vehicle containing the colloidal emulsifying agent is charged through the pipe 18 regulated by the valve 19 into an annular space 20 surrounding the upper part of the container and occupying the jacketed portion near the upper edge of the container. This space 20 is separated from the jacket by a partition shown at 21.

In the inner walls of this annular space are narrow slits shown at 22, through which the emulsifying liquid flows in a thin narrow film running down the edge of the container, and onto the surface of the rising emulsion body in a film-like form, evenly distributing itself over the surface of the emulsion body.

By distributing the mixture of water and colloidal emulsifying agent in this manner over the surface of the emulsion body, a better distribution is effected, and a more perfect distribution results.

To the inner jacketed portion 5$^a$ of the open ended cylinder 5 may be introduced a steam heating medium or water cooling medium through the line 23, thereby giving the heating or cooling effect as desired, in the body of the emulsion.

The medium used, is drawn off through the line 24. The bottom of the container has a cleanout or emptying plug 25, and at 26 is an emulsion drawoff line which is controlled by a gate valve 27.

In carrying out commercially the invention described in Letters Patent No. 1,302,810 issued May 8th, 1919, and as supplemented by subsequent applications and particularly an application Serial No. 274,497, filed February 1st, 1919, it has been the practice to produce a non-adhesive emulsion by dispersing adhesive bituminous binders with an emulsifying agent such as colloidal clay in an aqueous vehicle.

The bituminous material is, of course, in the dispersed phase while the water constitutes the continuous phase of such emulsion, the colloidal clay particles acting to coat or enclose the dispersed particles of bituminous binder probably by adsorption thereby protecting the particles of binder from adhesiveness. Under certain conditions when, for example, large proportions of asphalt were dispersed with small amounts of clay or when the emulsion, after being made, was subjected to extreme dilution with water, I have found the insulating or protecting quality of the clay particles could be effectively increased by the use of a fixing agent which caused the clay to cling or cluster more tenaciously about the particles of bituminous material. This function of the clay can be readily observed by microscopic examination of the emulsion, particularly with the use of stains such as malachite green which bring the clay particles into effective view. In other words, the third substance acts as a flocculating agent.

The formation of free oily particles in the emulsion, which seems to take place to a greater extent upon the hot surface thereof, was objectionable when it was desired to run the emulsion over a paper machine with fibrous stock or in other manufacturing uses when a maximum degree of non-adhesiveness was desired. From experimentation, it has been learned that a slight alkalinity of the clay promotes this oily condition of the emulsion. Lime in the clay will give like results and by adding alkali into the clay during emulsification, the tendency to produce oily particles is greatly accelerated.

To obviate this objectionable tendency, I add a third substance, having a slightly acid reaction, and having the purposes of a flocculating agent, to the emulsifying agent in its aqueous vehicle. Such substances as aluminum sulphate, sodium acid phosphate and others of a similar character supply elements to the emulsion which obviate the formation of these oily particles upon the surface of the emulsion during the mixing and, in addition, tend to cause the particles of emulsifying agent to cluster around the adhesive substance dispersed through the emulsion as before described. The addition of a third substance, such as aluminum sulphate, to an amount of one to fifteen per cent of the emulsifying agent in the emulsion is satisfactory to produce these results. However, it is understood that the quantity and concentration of this third substance is susceptible of variation according to its character and may be regulated according to the quality of the emulsifying agent used, and the character of the bituminous adhesive substance to be emulsified.

In producing this emulsion, the emulsifying agent, which may be clay, is thoroughly mixed in an aqueous vehicle and the third substance, which, as described, may be aluminum sulphate, sodium acid phosphate or numerous other materials having a slightly acid reaction or substances giving the above described results and not having the acid reaction, for example, of calcium chloride is added to the aqueous suspension. This suspension is combined with the asphalt in a mixer in which there are large paddles kept constantly revolving to thoroughly disperse the bituminous substance through the emulsifying liquid. The construction of this mixer is of importance as one of the essential factors in the formation of the emulsion is that the surface of the emulsion must be kept at all times covered by the emulsifying agent which is added. While I am not exactly certain of the causes of this oily formation, its appearance, when the hot emulsion contacts with air, seems to indicate some influence of the air in promoting what appears to be a capillary fractionation of some of the asphaltic particles. It is this keeping of the surface of the emulsion constantly covered in connection with the reagent used which reduces the formation of the oil particles during emulsification.

By placing the revolving paddles on a vertical shaft within an inner open-ended cylinder and causing a circulation of the emulsion downward through the inner cylinder and upward about the annular space between the inner and outer cylinder and simultaneously with this circulation adding the emulsifying agent in its aqueous vehicle to the outer circumference of the upper emulsion surface, the emulsifying agent is caused to flow inwardly with the emulsion completely covering its surface. During this operation, the emulsion is in the form of a stiff paste and sluggish to accelerate during mixing. It may be mentioned in this regard that the third substance added to assist in causing the non-adhesive particles of the emulsifying agent to more firmly envelop the adhesive particles of the bituminous substances assists the emulsifying agent in reducing the formation of the oil particles on the surface of the emulsion, a factor which may be due to the character of the material itself, or to the fact that it gives the emulsifying agent the tendency to cling to the adhesive particles and, therefore, more completely protect those exposed on the surface during the initial mixing.

While the effect of the fixing agent is substantially the same whether added before or after the formation of the emulsion, if desired to reduce the oily formation, it is preferably added with clay and water prior to emulsification.

I claim as my invention:

1. In an apparatus for forming emulsions, the combination with an enlarged mixing chamber, of an open ended smaller conduit therein, agitating elements, hollow jackets around the chamber and conduit adapted to contain heating or cooling mediums, a closed annular trough within the outer jacket, inlet means communicating with said trough for introducing ingredients to be emulsified and communications between the trough and enlarged chamber, and withdrawing means for the finished emulsion.

2. In an apparatus for forming emulsions, the combination with an enlarged barrel shaped mixing chamber, of an open ended smaller conduit therein, agitating elements, hollow jackets around the chamber and conduit adapted to contain heating or cooling mediums, a closed annular trough within the outer jacket, inlet means communicating with said trough for introducing emulsifying agents to be emulsified and communications between the trough and enlarged chamber, separate inlet means for introducing the bitumen, and withdrawing means for the finished emulsion.

3. In an apparatus for forming emulsions, the combination with an enlarged mixing chamber, of an open ended smaller conduit therein, propelling elements moving in the smaller conduit adapted to cause circulation of the contents downwardly through the open ended smaller conduit and then upwardly in the annular space between the conduit and enlarged chamber, and means for applying a heating or cooling medium to the contents of the emulsifier.

LESTER KIRSCHBRAUN.